Oct. 22, 1957 W. MIKULAS 2,810,174
SLIDE FASTENERS
Filed Sept. 17, 1953 3 Sheets-Sheet 1

INVENTOR.
WILLIAM MIKULAS
BY James and Franklin
ATTORNEYS

Oct. 22, 1957   W. MIKULAS   2,810,174
SLIDE FASTENERS
Filed Sept. 17, 1953   3 Sheets-Sheet 2
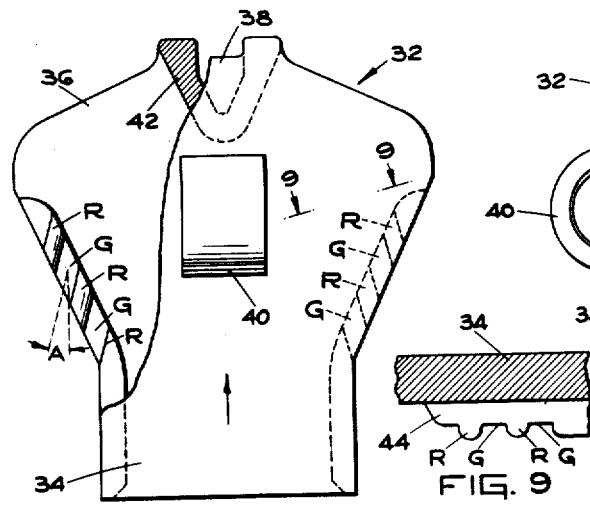
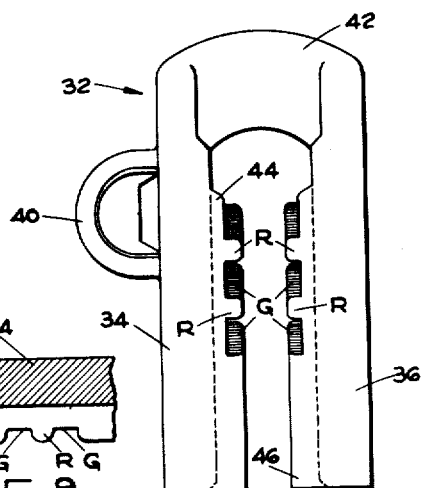
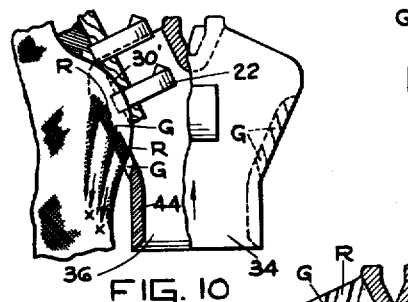
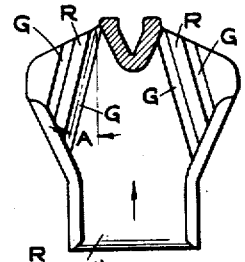
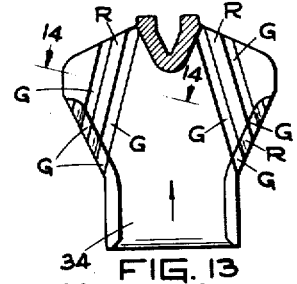
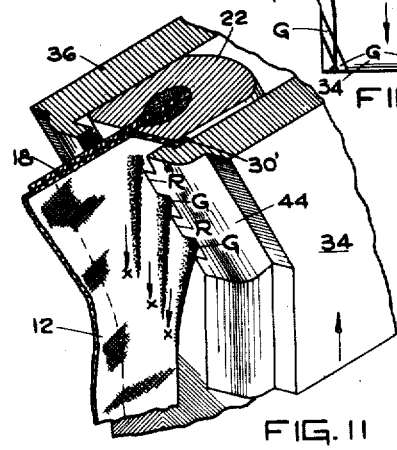
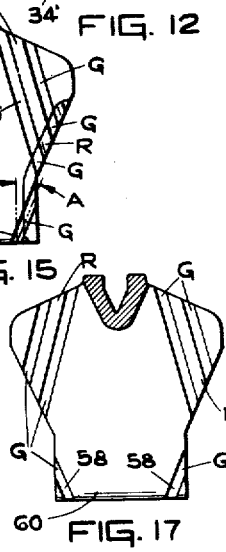
INVENTOR.
WILLIAM MIKULAS

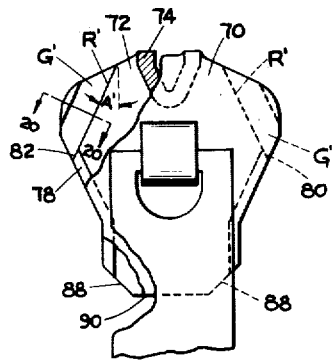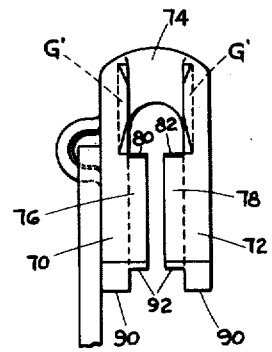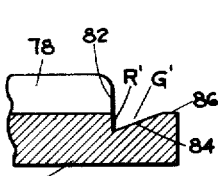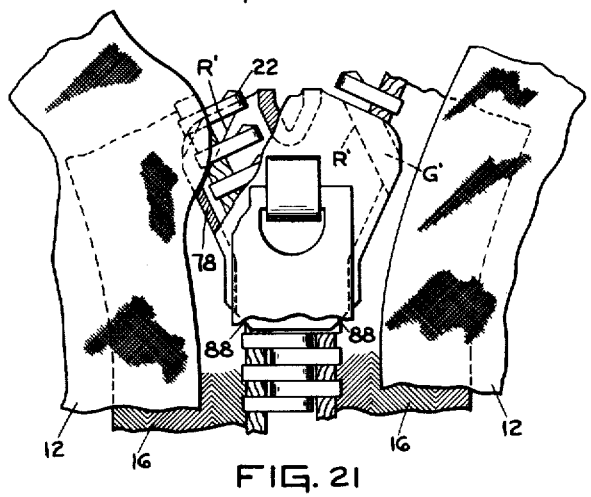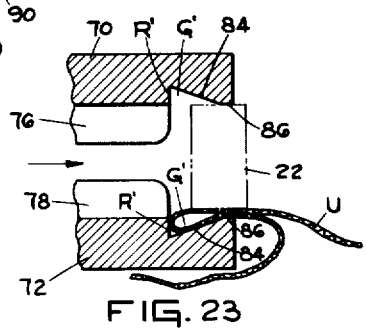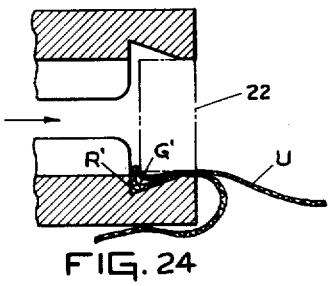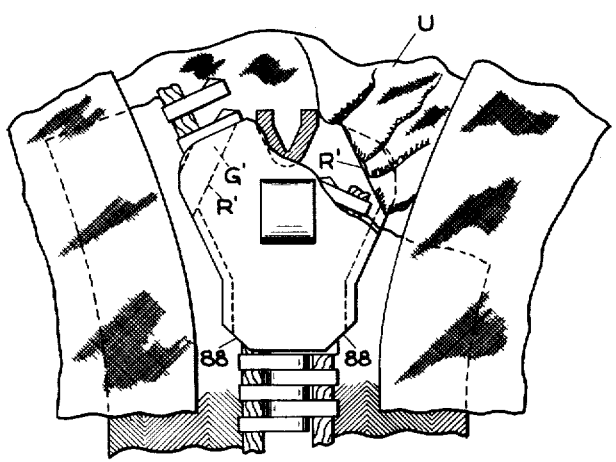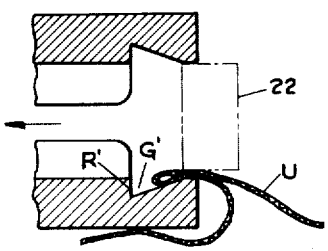

United States Patent Office 2,810,174
Patented Oct. 22, 1957

2,810,174

SLIDE FASTENERS

William Mikulas, Staten Island, N. Y., assignor to Conmar Products Corporation, Newark, N. J., a corporation of New Jersey Application September 17, 1953, Serial No. 380,786

27 Claims. (Cl. 24—205.15)

This application is a continuation in part of my prior application Serial No. 271,459, filed February 14, 1952, which in turn was a continuation in part of my still earlier application Serial No. 218,930, filed April 3, 1951.

The invention relates to sliders for slide fasteners of the type having spaced, interlockable fastener elements, and more particularly to sliders constructed to prevent jamming of the fastener upon material which may become lodged within the slider.

There are times, frequently due to the improper application of a slide fastener to an article such as a dress, when the material of the dress becomes caught within the slider. Sometimes a portion of an adjacent undergarment will enter the dress slider and cause the fastener to jam. This problem has received the attention of many workers in the art, and many solutions have been proposed.

It has been suggested to use sliders of the so-called "opening" or "removable" type. Sliders of this type are curative in concept, and have taken many different forms. Generally the snagged material may be released by temporarily opening up the slider. Sliders constructed in this fashion have not been commercially successful. Making the parts of a small slider movable with respect to each other requires the utmost of precision effort. Sliders of even the ordinary type must be held to very close tolerances. The production problem is greatly increased when parts of the slider are hinged, or otherwise made movable. The cost of producing these so-called "removable" sliders is greatly out of proportion to the price that the item will fetch, for the entire slide fastener, of which the slider is but a component, must be sold at a very low price. Moreover, there is the difficult problem of educating the public to properly use such slider.

A second approach to meet the problem may be termed preventative. Sliders have been provided with guards or plows intended to push away and thereby prevent the entrance of extraneous material into the slider. Thus far, sliders of this type also have not been commercially successful. The plows or guards themselves sometimes co-act with the fastener elements to snag material and jam the fastener. Moreover, such sliders are unduly bulky, and since the plows or guards extend beyond the slider proper, satisfactory closing of the fastener at its ends is prevented. Since the primary application of non-snagging sliders is for women's garments, the materials of which are comparatively sheer, bulky sliders and unsightly gaps are wholly unacceptable.

There are essentially two ways in which a slide fastener may become jammed or snagged. In one instance, which may be termed a "hem type" of jam, the garment portion or hem adjacent the garment's own fastener enters the side of the slider and works its way under a flange so that it becomes wedged within the slider channel between the slider wing and the fastener elements. In the other instance, which may be termed an "undergarment type" of jam, a portion of an undergarment in the path of movement of the slider of an outer garment enters the slider channel at the neck or diamond end of the slider and works its way around several fastener elements so that it becomes wedged between the fastener elements, a wing and the neck portion of the slider. In either case, the slider usually captures the extraneous or foreign material so gradually that the user is unaware of the impending jam until it is too late; the extraneous material becomes jammed within the slider channel to such an extent that the slider cannot be moved in either direction without damaging the material.

The present invention is based upon two wholly new concepts. For a hem type of jam, the slider is constructed to automatically convey out from within the slider the material which may tend to find its way into the slider channel. No special manipulative effort is required to release the extraneous material. The movement of the slider is simply continued, and the user is usually unaware that a potential jam ghas been cured at the threshold. The slider is constructed to automatically overcome and cure the resistance to movement which normally occurs when foreign material enters the channel. In effect, the slider is made to be self-curative of a potential jam.

For an undergarment type of jam, the slider is constructed to prevent extraneous or foreign material from gradually working its way so far into the slider channel that it becomes practically impossible to move the slider without damaging the garment or extraneous material. Foreign material must not be allowed to enter the stem portion of the channel, or that area within the channel where the fastener elements are meshed. The slider is constructed to effectively block the passage of extraneous material into the slider channel in such a fashion that the user immediately becomes aware of the presence of offending material. The movement of the slider is abruptly halted by sharp resistance encountered to its movement before the foreign material can work its way into the slider channel to any appreciable degree. The user is immediately and unmistakably put on notice that there is a piece of undergarment material in the way, and that the slider must be moved in the opposite direction. After backing the slider off, the user, then aware of the presence of foreign material in the path of the slider, clears the path so that the fastener may be opened or closed freely. In effect, the slider is made to prevent a jam of this type, and to prevent injury of the undergarment material, by definitely signalling the user that there is an obstruction present.

My improved slider is simple in construction, inexpensive and rugged. No special manipulative effort is required to release the foreign material, and the user does not need special instructions in the use of a fastener having such a slider. Auxiliary elements, such as plows, with their attendant disadvantages are eliminated. The slider is conventional in outward appearance and in manual operation. Nevertheless, it is constructed to automatically overcome and cure the resistance to movement which normally occurs when foreign material enters the channel from the side, or in the alternative to abruptly halt the movement of the slider before any damage can be done to material which would otherwise work its way down into the slider channel from either the post or mouth end.

To accomplish the foregoing objects, and such other objects as may hereinafter appear, my invention relates to a non-jamming slide fastener, and more particularly the slider component, as described in the following specification, taken together with the accompanying drawings in which:

Fig. 7 is a plan view, partly in section, showing one form of slider made in accordance with the present invention, the pull table being omitted since it forms no part of the invention;

Fig. 8 is a side elevation of the slider shown in Fig. 7;

Fig. 9 is a section taken approximately in the plane of line 9—9 of Fig. 7;

Fig. 10 is a plan view, partly in section, illustrating how the slider shown in Fig. 7 acts to guide foreign material out of the slider channel, thereby preventing the fastener from jamming;

Fig. 11 is an enlarged fragmentary view, partly in section, showing how extraneous material is conveyed back out of the slider;

Fig. 12 shows the inside of a wing of a slider made in accordance with another form of the invention;

Fig. 13 is a view similar to Fig. 12, of a slider wing combining the features previously shown;

Fig. 14 is a transverse section taken approximately in the plane of line 14—14 of Fig. 13;

Fig. 15 is a view similar to Fig. 12, illustrating a still further modification of the invention;

Fig. 16 is a side elevation of still another form of the invention, in which the slider has only two flanges;

Fig. 17 is a section taken approximately in the plane of the line 17—17 of Fig. 16;

Fig. 18 is a plan view, partly in section, showing another and preferred form of the invention;

Fig. 19 is a side elevation of the slider shown in Fig. 18;

Fig. 20 is a section taken approximately in the plane of line 20—20 of Fig. 18;

Fig. 21 is a plan view, partly in section, illustrating how this form of slider acts to automatically guide foreign material or a hem out of the slider channel, thereby preventing the fastener from jamming;

Fig. 22 is also a plan view, partly in section, illustratting how this form of slider acts upon a portion of an undergarment which may tend to enter the slider channel by halting the movement of the slider before the fastener becomes jammed; and Figs. 23, 24 and 25 schematically illustrate the manner in which the slider functions to prevent an undergarment type of jam or snag from occurring, and how the slider is freed from the foreign material.

Figure 1:
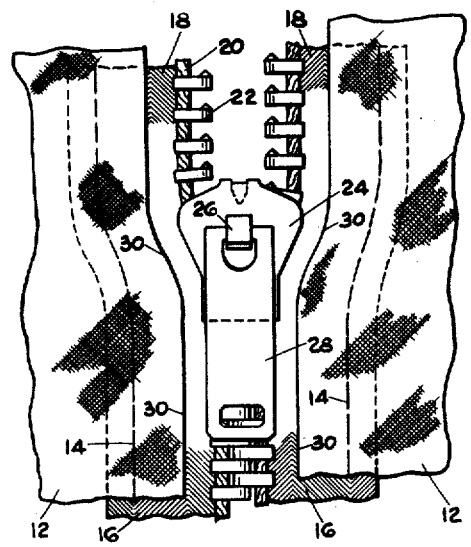
Fig. 1 is a partial plan view of a garment such as a dress, having a slide fastener sewn therein in accordance with one of the acceptable procedures.

Referring to the drawings, particularly Fig. 1, a slide fastener of the conventional type is sewn to portions 12 of a garment, such as a dress, by lines of stitching 14. The slide fastener comprises the usual pair of stringers 16, each consisting of a taper 18 having a beaded or raised edge 20 along which are provided a series of spaced, interlockable fastener elements 22. The slide fastener elements are engaged and disengaged by the up and down movement of a slider 24. One wing of the slider is provided with a lug 26 to which a pull tab 28 is attached to facilitate movement of the slider. The slide fastener has been sewn to the material of the garment in accordance with acceptable practice, the edges 30 being spaced from the fastener elements 22 a sufficient distance not to interfere with the movement of the slider 26 along the fastener elements.

Figure 2:
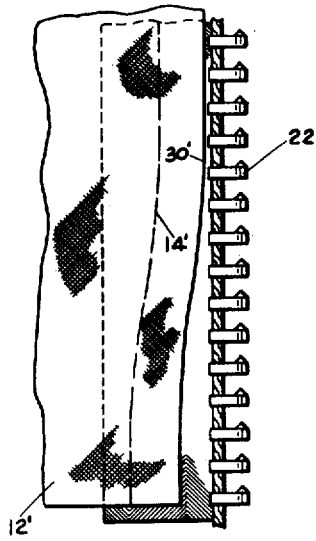
Fig. 2 is a partial plan view illustrating one of the improper but not uncommon ways of applying a slide fastener stringer to a garment.

As shown in Fig. 2, a sewing machine operator sometimes is not sufficiently careful in sewing the slide fastener into the garment, with the result that the edge 30' is located too close to the fastener elements 22. In such case, the possibility of garment material becoming caught and wedged in the slider is greatly increased.

Figure 3:
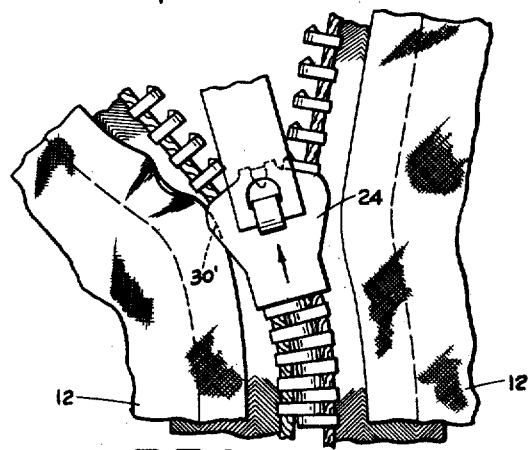
Fig. 3 is a view similar to Fig. 1, illustrating how even with a properly applied fastener, the slider may snag the material of the garment.
Figure 4:
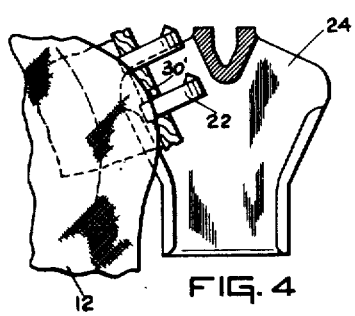
Figs. 4, 5 and 6 are partial plan views, with the top wing of the slider omitted for clarity in illustration, showing the manner in which extraneous material may enter a slider and be progressively wedged therein upon upward movement of slider.

Fig. 3 illustrates how even though the slide fastener may be properly sewn to a garment, as shown in Fig. 1, the fastener may become jammed. When a sideward twist is imparted to the slider as it is moved in fastener-closing direction, the edge of the garment material may become caught under a wing of the slider. When this occurs, or when as shown in Fig. 2, the fastener has been improperly applied, material may become caught between the slider and a fastener element, as shown in Fig. 4. Material may become snagged with the slider moving in fastener-opening direction, but snagging occurs most frequently when the slider is moved in fastener-closing direction, as shown in Figs. 3 to 6. The divergence of the arm portions of the Y-shaped slider encourages the entry of extraneous material.

Figure 5:
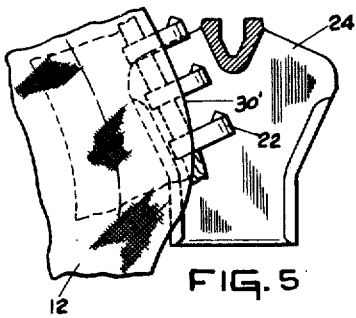
Figure 6:
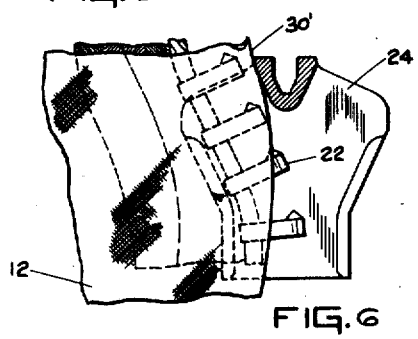

When material is first caught in the slider the operator is usually unaware of the occurrence, and continues to move the slider in the desired or closing direction. Other fastener elements move into the slider channel, and more extraneous material is drawn into the slider, as shown in Fig. 5. The surfaces of the added fastener elements in the slider channel add their wedging action to the extraneous material. As the extraneous material is drawn into the slider, it is moved over toward the center of the slider. Finally, as shown in Fig. 6, a huge mass of material is drawn into the slider, and stops further movement. The extraneous material has been drawn toward the center of the slider until it bears against the "diamond" or neck portion, or until it is located in the zone where the working ends of the fastener elements are intended to overlap and come into mesh with each other. In fact, the offending material has also been drawn over those fastener elements which have not yet entered but are about to enter the slider, and thus the fastener is completely jammed. At this point, an attempt is usually made to move the slider in the opposite or fastener-opening direction. However, the fastener may be jammed so tightly that the fabric of the garment is torn in the effort, and often the slider cannot be moved back at all.

Referring now to Figs. 7 to 10, a slider using some features of the present invention comprises a slider body 32 having a front wing 34 and a rear wing 36 spacedly connected at one end, as at 38. The front wing 34 is provided with a lug 40 to which a pull tab (not shown) is attached. The connected ends 38 of the wings define the neck or so-called "diamond" 42 of the slider. The wings 34 and 36 are formed with the usual inturned side flanges 44 and 46, respectively. The inner surfaces of the wings and their inturned side flanges together with the neck or "diamond" define a substantially Y-shaped channel for engaging and disengaging the fastener elements of the stringers. As so far described, the slider is of conventional construction, and may be of the non-lock, pin-lock, wing-lock, cam-lock or automatic-lock type.

In accordance with one main feature of the present invention, the slider is provided with escape passages to afford escape of extraneous material. These passages are preferably designed for automatically guiding or conveying such extraneous material away from the central longitudinal zone of the slider. More specifically, provision is also made for guiding or conveying the extraneous material completely out of the slider where it will no longer interfere with the movement of the slider.

In all forms of the invention shown in Figs. 7 to 25, a part of the slider defining the internal slider channel is provided with guide means in the form of a groove or grooves G. The grooves, which have adjacent walls or ribs R, act to guide extraneous material outwardly, or, as preferred, out of the slider channel entirely. When a piece of fabric material finds its way into the slider channel, portions thereof are forced into the grooves G and against its side walls or ribs R.

Upon continued movement of the slider, the fabric material will follow the path of the grooves, and along the miniature rails R. The grooves are angularly disposed so that they diverge outwardly in a direction opposite to the direction of slider movement.

In this manner, the extraneous material is led away from the area where it will cause the fastener to jam. Preferably, the offending material is conveyed to the outside of the slider. The obstruction to movement of the slider is thus automatically overcome at the threshold. Continued movement cures the potential jam, instead of aggravating it. Any suitable diverging angle, indicated at "A" in Fig. 7, between the longitudinal axis of the groove and the longitudinal axis of the slider, may be selected. It will be noted that the grooves are at an acute angle (less than 90°) to the flanges. Indeed, with grooves in the divergent flanges alone, they might be parallel to the slider axis, that is, even more acute to the flanges than shown, and yet afford escape of material. It has been found, however, that in the sliders of Figs. 7–17 a diverging angle at "A" of approximately 15° gives highly satisfactory results.

Referring now to the specific embodiment of the invention illustrated in Figs. 7 to 11, the slider flange is provided with escape passages or anti-jamming means to cure jamming which occurs when the slider is moved in fastener-closing direction. This kind of jamming is by far the most common. A single groove may be used, or a plurality of spaced, substantially parallel grooves G in each flange. While benefit is obtained with less than a full set of guide means (that is, in both top and bottom wings and on both sides), a full set prevents jamming on top, bottom, right and left sides of the slider, to take care of any eventuality. The grooves extend all the way through the flanges, and are defined by adjacent walls or ribs R along their lengths.

As shown in Figs. 10 and 11, when a piece of undesirable fabric material 30' enters the slider channel and becomes wedged between the top wing 34 with its inturned flange 44, and a fastener element or fastener elements 22, portions of the material are forced into the grooves G and sidewardly against the ribs R. Continued movement of the slider in closing direction causes the fabric to be tracked outwardly from within the slider channel in the direction of the arrows X. Thus, the movement of the slider itself acts to automatically guide the extraneous material out from within the slider.

Referring now to Figs. 8, 9 and 10, the escape passages or grooves have a dimension too small to catch and lock, or to permit escape of, the interlockable elements. More specifically, in Figs. 8 and 9 it will be seen that the grooves have a height substantially less than the height of the flanges in which they are formed. Moreover, as is best shown in Fig. 10, the grooves have a width less than the thickness of the interlockable elements. Either precaution would alone prevent the elements from locking in or escaping through the grooves, and both precautions together result in a slider action which is just as smooth as though the escape passages or guide grooves had not been provided at all. These narrow passages are nevertheless adequate to guide the fabric out of the slider.

Another form of the invention is illustrated in Fig. 12. Instead of forming grooves and ribs in the flange portions of the slider, the grooves are formed in the flat portions which define the channel within the flanges. Only the top wing 34' is shown in this figure. While a slider thus made will not necessarily guide the extraneous material completely out from within the slider channel, the grooves will act to guide the material outwardly away from the central longitudinal area of the channel, at or beneath the "diamond," where the material otherwise would be certain to jam the fastener. With this form of the invention, the user is usually able to work the slider free of the material lodged in the slider, before the fastener is really jammed.

In the form of the invention shown in Figs. 13 and 14, the guide grooves are formed in both the flat inner surfaces of the wing and in the flange portions. In this form of the invention, very large tracking and guiding areas are provided, thereby increasing the power of the slider to automatically convey extraneous material out of the slider. In a sense, in this form of the invention the face grooves may be considered predominantly guide grooves, and the flange grooves may be considered predominantly escape grooves, and both are preferably though not necessarily arranged in alignment as shown.

Fig. 15 illustrates additional anti-jamming means formed in the stem portion of the Y-shaped channel of the slider. The lowermost grooves G in this instance preferably are formed in both the flat and flange portions of the slider, in order to supply sufficient trackage or groove area for guiding extraneous material out from within the slider. While, as previously indicated, most instances of fastener-jamming occur when the slider is moved in fastener-closing direction, it is possible for extraneous material to become lodged within the slider channel when the slider is moved in the fastener-opening direction indicated by the arrow. The grooves therefore are arranged in a direction reverse to the groove direction for fastener-closing movement. In both cases the grooves diverge in a direction opposite to the direction of movement of the slider.

It will be understood, of course, that each of the sliders shown in Fig. 10, Fig. 12 or Fig. 13, may have its stem portion provided with the guide means shown in Fig. 15. This is suggested by the upper grooves shown in Fig. 15.

Figs. 16 and 17 show still another form of my invention. It has been found that a slider having flanges on only one of the two wings works substantially as well as a slider having flanges on both wings. The slider of Fig. 16 comprises a front wing 50 and a rear wing 52 connected by a neck 54, but only one wing, preferably the rear wing 52, has side flanges 56. Snagging most frequently occurs at the top of the fastener because of the usual manner in which a fastener is sewn into a dress, and it is therefore preferable to locate the flanges on the bottom wing, for the flanges encourage the entrance of extraneous material into the slider channel. By omitting the flanges on the top wing the likelihood of entrance of extraneous material is lessened.

Nevertheless such material may enter the slider channel and will snag, and in accordance with the principles of the present invention already outlined, I provide divergent grooves or escape passages to guide the extraneous material back out of the slider. By omitting the flanges on the top wing an unobstructed path is provided for the extraneous material to be guided back out of the slider by the diverging grooves or escape passages. For this purpose the flat inner face of the flangeless front wing 50 is provided with a plurality of spaced, substantially parallel grooves G, and intermediate ribs R, which diverge downwardly, that is, in a direction opposite to the direction of fastener-closing movement of the slider. In addition, if desired, grooves 58 may also be formed in the stem portion 60, these diverging upwardly, and functioning when the slider is moved in fastener-opening direction. The upper grooves formed in the arm portions of the Y-shaped channel function when the slider is moved in fastener-closing direction.

It will be understood that, if desired, the invention may be applied even more completely to a slider having one flangeless wing by providing additional escape passages in the flanges or/and the adjacent flat surface of the flanged wing. In terms of the drawing, the front wing 50 of Figs. 16 and 17 may be used in combination with a rear wing like that shown in Figs. 7–10 having grooves through the flanges, or with a rear wing like that shown in Fig. 12 having grooves in the flat face within the flanges, or with a rear wing like that shown in Fig. 13 having grooves in both the flanges and the flat surface, or with a rear wing like that shown in Fig. 15 in which there are grooves in the stem portion as well as the arm portions of the Y-shaped channel.

The most preferred slider constructions hereinbefore described have been found to effectively cure a potential jam of the side or hem type. The form of the invention shown in Figs. 18 to 25 is additionally effective in preventing a snag or jam of the undergarment type. The slider shown in these views comprises a front wing 70 and a rear wing 72 connected by a neck portion 74, the wings each being provided with a pair of inturned side flanges 76 and 78, respectively. At the top end of the slider and above the upper ends of the inturned flanges, a groove G' is provided. One side of the groove acts as a wall, rib or abutment R', which is adjacent to and parallel to the groove. The grooves and abutments are preferably provided in each wing of the slider on each side of the neck portion, or four sets of grooves and abutments in all.

As shown in Fig. 21, the grooves and abutments G', R', serve the same purpose and function as the previously described grooves and ribs G, R, in automatically feeding extraneous material such as a hem out from the side of the slider. However, whereas the diverging angle of the previously described grooves and ribs is preferably 15°, this angle, designated A', is now between 20 and 35°, and preferably 25°, for the now added function of preventing an undergarment type of jam.

As shown in Figs. 18 and 19, each groove G' and its adjacent abutment R' extend from near the post portion 74 down to the side of the slider with the abutment coincident or in line with the upper end of an inturned side flange. The upper ends of the inturned side flanges 76, 78 are designated 80, 82, respectively. The slider shown possesses the usual dimensions so that to obtain the coincidence of the abutments R' with the upper ends 80, 82 of the inturned side flanges, these side flanges are shortened slightly. The amount that the side flanges are shortened is approximately equal to the width of a groove G'. While a slider of ordinary dimensions with slightly shortened inturned side flanges has been found satisfactory, it is within the purview of the invention to increase the overall length of the slider and thus retain the original length of the inturned flanges. In any event, it will be observed that the grooves G' and their adjacent abutments R' are located above the inturned flanges and in the otherwise flat portions of the wings.

As shown in Fig. 20, the groove and abutment arrangement, G', R', is preferably made saw-toothed in cross-section, there being a gradual slope 84 from a leading flat portion 86 of the wing to the base of the abutment R'. The flat portion 86 is substantially in the same plane as the inner surface of the wing so that there is no easy access of foreign material into the slider channel. The top ends 80, 82 of the inturned side flanges, for reasons which will be subsequently explained, are each made substantially perpendicular to the slider wing rather than with the usual gently sloping bevel of ordinary sliders. These squared ends of the inturned side flanges are each in line with the substantially vertical abutment walls R'.

When, as shown in Fig. 22, a portion of an undergarment, designated U, is located in the path of the slider when the slider is moved in fastener-closing direction, and would tend to enter the slider channel, the material controllably and abruptly halts the movement of the slider before the slider can capture it to an extent where it becomes practically impossible to extricate the material from the slider. As shown in greater detail, in Figs. 23 to 25, if the undergarment material does get beyond the flat portion 86, the material is forced into the groove G', and is halted by the abutment R'. The space between the flat portion 86 and the adjacent sides of the fastener elements 22 is comparatively small so that the foreign material does not easily enter the slider channel, but if it does get through this space, the groove G' provides an increased space which serves to relieve the pressure of the slider upon the foreign material.

The diverging angle of the groove and abutment then act to guide or escort the material toward the flange end, which, because of its squared or vertical surface, supplements the blocking action of the groove and abutment. It has been found that the undergarment material actually piles up at the end of the flange and goes no further. When this occurs, the user immediately perceives that something is wrong, because the slider's movement is halted very abruptly. Ordinarily, undergarment material is sheer, and without the present invention, snakes into the slider so gradually, that before the user is aware of it, the slider cannot be moved in either direction. By means of the slider of the present invention, however, the offending material is gathered together or lumped in a manner which not only abruptly halts the movement of the slider, but permits the slider to be backed off very easily, as shown in Fig. 25. Now aware of the obstacle to slider movement, the user then pulls the outergarment outward away from the undergarment, or pushes the undergarment material out of the path of movement of the slider.

In the majority of cases, if snagging or jamming occurs, whether of the hem or undergarment type, it is upon the movement of the slider in the up or fastener-closing direction. For those few occasions which may occur when the slider is moved down or in fastener-opening direction, the narrow or mouth end of the slider may be provided with grooves at the corners of the mouth end of the slider, as shown in Fig. 15, except that each of the groove is made to diverge at an angle of approximately 20 to 35° instead of approximately 15°, as there shown. For simplicity in manufacture, however, the slider is preferably made to overcome the two described types of jams by providing a diverging chamfer 88 of between approximately 20° to 45° at each of the four corners of the slider, as shown in Figs. 18, 19, 21 and 22 in the drawing the chamfer is at 45°. The chamfers result in a slight shortening of the inturned flanges 76, 78 which would otherwise extend to the extreme lower ends of the slider 90. This small amount of flange shortening has been found not to interfere with the operation of the slider. The overall length of the slider may be lengthened to compensate for this, if desired. The inturned flanges themselves are also chamfered, and are formed so that their extreme edges 92 are each squared or at right angles to the inner surface of an adjacent wing. The chamfered edges act to guide hem material outwardly and away from within the slider, and the squared ends of the inturned side flanges serve to block any material which might tend to enter the mouth of the slider.

The described grooves and ribs may be formed in any suitable fashion. If the slider is made by stamping, the grooves may be formed by stamping in the same process of manufacture. If the slider is made by die casting, the grooves may be made in the die casting operation. If desired, a conventional slider may be subjected to an extra operation to cut or form the grooves.

It is believed that the construction and operation of the slider of my invention, as well as the advantages thereof, will be apparent from the foregoing detailed description. It will also be apparent that while I have shown and described my invention in several preferred forms, changes may be made in the structures disclosed without departing from the scope of the invention, as sought to be defined in the following claims.

I claim:

1. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, and a groove formed in an inturned side flange intermediate the ends to convey extraneous material entering the channel in a direction outwardly from the channel, said groove extending outwardly from one end in a direction opposite to the direction of movement of the slider on the stringers when said end is the leading end of the slider, and said groove being too small in dimension to lock or permit the escape of the interlockable elements.

2. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, and a plurality of spaced, substantially parallel grooves formed in the arm portions of the inturned side flanges to convey extraneous material entering the channel in a direction outwardly from the channel, said grooves diverging from one end in a direction opposite to the fastener-closing direction of movement of the slider on the stringers when said end is the leading end of the slider.

3. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, and a plurality of spaced, substantially parallel grooves formed in the flat inner arm portions of a wing to convey extraneous material entering the channel in a direction outwardly relative to the channel, said grooves diverging from one end in a direction opposite to the direction of fastener-closing movement of the slider on the stringers when said end is the leading end of the slider.

4. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a groove formed in an inturned side flange and an adjacent groove formed in a flat inner surface portion of a wing intermediate the ends to convey extraneous material entering the channel in a direction outwardly from the channel, said grooves extending outwardly from one end in a direction opposite to the direction of movement of the slider on the stringers when said end is the leading end of the slider.

5. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a plurality of spaced, substantially parallel grooves formed in the arm portions of side flanges and adjacent grooves formed in the adjacent flat inner arm portions of the wing to convey extraneous material entering the channel in a direction outwardly from the channel, said grooves diverging in a direction opposite to the fastener-closing direction of movement of the slider along the stringers.

6. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a plurality of spaced, substantially parallel grooves formed in each of the arm portions of the inturned side flanges, grooves formed in the stem portions of the inturned side flanges, said grooves diverging in a direction opposite to the direction of movement of the slider along the stringers and serving to convey extraneous material entering the channel in a direction outwardly from the channel in either direction of slider movement.

7. A slider for slide fasteners of the type having two stringers with a series of spaced, interlockable elements, said slider comprising a body having a front wing and a rear wing spacedly connected at one end, and further comprising inturned side flanges, said parts providing a substantially Y-shaped internal channel, a plurality of spaced, substantially parallel grooves formed in the arm portions of inturned side flanges, adjacent grooves formed in the adjacent flat inner arm portions of the wings, grooves formed in the stem portions of inturned side flanges, and adjacent grooves formed in the adjacent flat inner stem portion of the wing, said grooves diverging in a direction opposite to the direction of movement of the slider along the stringers and serving to convey extraneous material entering the channel in a direction outwardly from the channel in either direction of slider movement.

8. A slider for slide fasteners of the type having two stringers with a series of spaced, interlockable elements, said slider comprising a front wing and a rear wing spacedly connected at one end, one wing having marginal flanges, and the other wing being flangeless, said parts providing a substantially Y-shaped internal channel, the inside face of the flangeless wing having a groove formed in each of the arm portions, said grooves diverging in a direction opposite to the direction of fastener-closing movement of the slider and serving to convey extraneous material entering beneath the flangeless wing in a direction outwardly from beneath the said wing.

9. A slider for slide fasteners of the type having two stringers with a series of spaced, interlockable elements, said slider comprising a front wing and a rear wing spacedly connected at one end, said rear wing having marginal flanges, and said front wing being flangeless, further comprising the inside face of the front wing having a groove formed in each of the arm portions, said grooves diverging in a direction opposite to the direction of fastener-closing movement of the slider and serving to convey extraneous material entering beneath the front wing in a direction outwardly from beneath the front wing.

10. A slider for slide fasteners of the type having two stringers with a series of spaced, interlockable elements, said slider comprising a front wing and a rear wing spacedly connected at one end, said rear wing having marginal flanges, and said front wing being flangeless, further comprising the inside face of the front wing having a plurality of spaced, substantially parallel grooves formed in each of the arm portions, said grooves diverging in a direction opposite to the direction of fastener-closing movement of the slider and serving to convey extraneous material entering beneath the front wing in a direction outwardly from beneath the front wing.

11. A slider for slide fasteners of the type having two stringers with a series of spaced, interlockable elements, said slider comprising a front wing and a rear wing spacedly connected at one end, said rear wing having marginal flanges, and said front wing being flangeless, further comprising the inside face of the front wing having a plurality of grooves formed in the stem portion, said grooves diverging in a direction opposite to the direction of fastener-opening movement of the slider and serving to convey extraneous material entering beneath the front wing in a direction outwardly from beneath the front wing.

12. A slider for slide fasteners of the type having two stringers with a series of spaced, interlockable elements, said slider comprising a front wing and a rear wing spacedly connected at one end, said rear wing having marginal flanges, and said front wing being flangeless further comprising the inside face of the front wing having a plurality of spaced, substantially parallel grooves formed in each of the arm portions, grooves formed in the stem portion, said grooves diverging in a direction opposite to the direction of movement of the slider and serving to convey extraneous material entering beneath the front wing in a direction outwardly from beneath the front wing in either direction of slider movement.

13. A slide fastener having two stringers with spaced, interlockable elements, and a slider, said slider comprising a front wing and a rear wing spacedly connected at their upper end, and further comprising inturned side flanges, said parts providing a substantially Y-shaped internal channel, said flanges intermediate their ends having escape grooves to afford release of extraneous material which may be accidentally caught in the slider during movement thereof, said escape grooves being disposed at an acute angle relative to the flanges in which they are formed, with the inner end of each groove nearer the upper end of the slider than the outer end of said groove, said escape grooves having a height less than the height of the flanges in which they are formed, and having a width less than the thickness of the interlockable elements, whereby said interlockable elements cannot lock in or escape through said grooves.

14. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing beyond the end of an inturned side flange, said groove diverging from one end in a direction opposite to the direction of movement of the slider on the stringers when said end is the leading end of the slider, one side of said groove acting as an abutment adjacent to and parallel to said groove, said groove and abutment acting to convey extraneous material tending to enter the channel from the side in a direction outwardly relative to the channel and to block the entry of extraneous material tending to enter the channel from the leading end of the slider.

15. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing beyond the end of an inturned side flange, the end of said flange being squared, said groove diverging from one end in a direction opposite to the direction of movement of the slider on the stringers when said end is the leading end of the slider, one side of said groove acting as an abutment adjacent to and parallel to said groove, said abutment being substantially coincident with the end of the inturned side flange, said groove and abutment acting to convey extraneous material tending to enter the channel from the side in a direction outwardly relative to the channel and to block the entry of extraneous material tending to enter the channel from the leading end of the slider.

16. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing above the upper end of an inturned side flange, the end of said flange being squared, said groove diverging from the neck end in a direction opposite to the direction of fastener-closing movement of the slider on the stringers when said neck end is the leading end of the slider, one side of said groove acting as an abutment adjacent to and parallel to said groove, said abutment being substantially coincident with the end of the inturned side flange, said groove and abutment acting to convey extraneous material tending to enter the channel from the side in a direction outwardly relative to the channel and to block the entry of extraneous material tending to enter the channel from the neck end of the slider.

17. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing above the upper end of an inturned side flange, the end of said flange being squared, said groove diverging from the neck end in a direction opposite to the direction of fastener-closing movement of the slider on the stringers when said neck end is the leading end of the slider, one side of said groove acting as an abutment adjacent to and parallel to said groove, said abutment being substantially coincident with the end of the inturned side flange, said groove and abutment arrangement being saw-toothed in cross-section, there being a slope from a leading flat portion of the wing to the base of the abutment, said groove and abutment acting to convey extraneous material tending to enter the channel from the side in a direction outwardly relative to the channel and to block the entry of extraneous material tending to enter the channel from the neck end of the slider.

18. A slider for slide fasteners of the type having two stringers with a series of spaced, interlockable elements, said slider comprising a body having a front wing and a rear wing spacedly connected at one end by a neck portion, and further comprising a pair of opposed inturned side flanges on each of said wings, said parts providing a substantially Y-shaped internal channel, a groove formed in each wing above the upper end of each inturned side flange, the end of each of said flanges being squared, said grooves diverging from the neck end in a direction opposite to the direction of fastener-closing movement of the slider on the stringers when said neck end is the leading end of the slider, one side of each groove acting as an abutment adjacent to and parallel to said groove, said abutments each being substantially coincident with the end of an inturned side flange, said groove and abutment arrangement being saw-toothed in cross-section, there being a slope from a leading flat portion of the wing to the base of the abutment, said grooves and abutments acting to convey extraneous material tending to enter the channel from the side in a direction outwardly relative to the channel and to block the entry of extraneous material tending to enter the channel from the neck end of the slider.

19. A slider for slide fasteners of the type having two stringers with a series of spaced, interlockable elements, said slider comprising a body having a front wing and a rear wing spacedly connected at one end by a neck portion, and further comprising a pair of opposed inturned side flanges on each of said wings, said parts providing a substantially Y-shaped internal channel, a groove formed in each wing above the upper end of each inturned side flange, the end of each of said flanges being squared, said grooves diverging approximately 20 to 35 degrees from the neck end in a direction opposite to the direction of fastener-closing movement of the slider on the stringers when said neck end is the leading end of the slider, one side of each groove acting as an abutment adjacent to and parallel to said groove, said abutments each being substantially coincident with the end of an inturned side flange, said groove and abutment arrangement being saw-toothed in cross-section, there being a slope from a leading flat portion of the wing to the base of the abutment, said grooves and abutments acting to convey extraneous material tending to enter the channel from the side in a direction outwardly relative to the channel and to block the entry of extraneous material tending to enter the channel from the neck end of the slider.

20. A slider for slide fasteners of the type having two stringers with a series of spaced, interlockable elements, said slider comprising a body having a front wing and a rear wing spacedly connected at one end by a neck portion, and further comprising inturned side flanges, said parts providing a substantially Y-shaped internal channel, a groove formed in a wing above the upper end of an inturned side flange, the end of said flange being squared, said groove diverging from the neck end in a direction opposite to the direction of fastener-closing movement of the slider on the stringers when said neck end is the leading end of the slider, one side of said groove acting as an abutment adjacent to and parallel to said groove, said abutment being substantially coincident with the end of the inturned side flange, said groove and abutment acting to convey extraneous material tending to enter the channel from the side in a direction outwardly relative to the channel and to block the entry of extraneous material tending to enter the channel from the neck end of the slider, and a diverging chamfer at the corner of each of the wings at the mouth end of the slider.

21. A slider for slide fasteners of the type having two stringers with a series of spaced, interlockable elements, said slider comprising a body having a front wing and a rear wing spacedly connected at one end by a neck portion, and further comprising a pair of inturned side flanges on each of said wings, said parts providing a substantially Y-shaped internal channel, a groove formed in each wing above the upper end of each inturned side flange, the end of each of said flanges being squared, said grooves diverging approximately 20 to 35 degrees from the neck end in a direction opposite to the direction of fastener-closing movement of the slider on the stringers when said neck end is the leading end of the slider, one side of each groove acting as an abutment adjacent to and parallel to said groove, said abutments each being substantially coincident with the end of an inturned side flange, said groove and abutment arrangement being sawtoothed in cross-section, there being a slope from a leading flat portion of the wing to the base of the abutment, said grooves and abutments acting to convey extraneous material tending to enter the channel from the side in a direction outwardly relative to the channel and to block the entry of extraneous material tending to enter the channel from the neck end of the slider, and a diverging chamfer at the corner of each of the wings at the mouth end of the slider.

22. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed in a direction which diverges outwardly relative to the longitudinal axis of the slider from the neck end toward the stem end of the slider and which is at an acute angle with respect to the direction of the upwardly diverging arm of the channel from which the groove guides extraneous material, said groove being too small in dimension to lock or permit the escape of the interlockable elements.

23. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a plurality of substantially parallel grooves formed in an inturned side flange to guide extraneous material outwardly from the channel, each of said grooves being disposed in a direction which diverges outwardly relative to the longitudinal axis of the slider from the neck end toward the stem end of the slider and which is at an acute angle with respect to the direction of the upwardly diverging arm of the channel from which the groove guides extraneous material, and said grooves being too small in dimension to lock or permit the escape of the interlockable elements.

24. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed at an acute angle relatively outwardly with respect to the direction of the upwardly diverging arm of the channel from which arm the groove guides extraneous material outwardly, and the upper inner end of said groove being nearer the upper end of the slider than the lower outer end of said groove, said lower outer end being substantially higher than the lower end of the slider.

25. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed at an acute angle relatively outwardly with respect to the direction of the upwardly diverging arm of the channel from which arm the groove guides extraneous material outwardly, and the upper inner end of said groove being nearer the upper end of the slider than the lower outer end of said groove, said lower outer end being substantially higher than the lower end of the slider, said groove being too small in dimension to lock or permit the escape of the interlockable elements.

26. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed in a direction which diverges outwardly relative to the longitudinal axis of the slider from a first end toward a second end of the slider, and which is at an acute angle with respect to the direction of the channel at said groove, and said groove being located nearer the first end than the junction of that part of a flange which defines the stem with that part of the same flange which defines an arm of the channel.

27. A slider for slide fasteners of the type having two stringers comprising tapes provided with a series of spaced, interlockable elements, said slider comprising a front wing and a rear wing spacedly connected at the upper or neck end of the slider, at least one of said wings having inturned side flanges along its side edges to thereby provide a substantially Y-shaped internal channel having a stem portion and upwardly diverging arms for the engagement and disengagement of the interlockable elements and to provide side slots for the tapes, and a groove formed in a wing to guide extraneous material outwardly from the channel, said groove being disposed in a direction which diverges outwardly relative to the longitudinal axis of the slider from the neck end toward the stem end of the slider and which is at an acute angle with respect to the direction of the upwardly diverging arm of channel from which the groove guides extraneous material, and said groove being located nearer the neck end than the junction of that part of a flange which defines the stem with that part of the same flange which defines an arm of the channel.

References Cited in the file of this patent

UNITED STATES PATENTS

| | | |
|---|---|---|
| 2,078,745 | Ulrich | Apr. 27, 1937 |
| 2,119,352 | Puc | May 31, 1938 |
| 2,174,002 | Hyde | Sept. 26, 1939 |
| 2,421,791 | Legat | June 10, 1947 |
| 2,568,163 | Morin | Sept. 18, 1951 |
| 2,596,861 | Meech | May 13, 1952 |

UNITED STATES PATENT OFFICE

CERTIFICATE OF CORRECTION

Patent No. 2,810,174                                     October 22, 1957

William Mikulas

It is hereby certified that error appears in the printed specification of the above numbered patent requiring correction and that the said Letters Patent should read as corrected below.

Column 3, line 14, for "table" read --tab--; column 7, line 5, strike out "most preferred" and insert the same before "form" in line 7, same colum same column 7, line 69, after "detail" strike out the comma; column 8, line 39, for "and 22 in the" read -- and 22. In the--; column 10, line 66, afte "flangeless" insert a comma.

Signed and sealed this 11th day of February 1958.

(SEAL)
Attest:

KARL H. AXLINE

Attesting Officer

ROBERT C. WATSON
Commissioner of Patents